United States Patent [19]

Dale

[11] Patent Number: 5,086,857
[45] Date of Patent: Feb. 11, 1992

[54] ROLLER DRIVE UNIT

[76] Inventor: Gerald H. Dale, Okanagan, Gristhorpe, Filey, England, YO14 9PH

[21] Appl. No.: 460,176
[22] PCT Filed: Jul. 21, 1988
[86] PCT No.: PCT/GB88/00593
   § 371 Date: Feb. 12, 1990
   § 102(e) Date: Feb. 12, 1990
[87] PCT Pub. No.: WO89/00514
   PCT Pub. Date: Jan. 26, 1989

[30] Foreign Application Priority Data

Jul. 22, 1987 [GB] United Kingdom ............... 8717310

[51] Int. Cl.⁵ ..................... B60K 17/28; B60K 25/00
[52] U.S. Cl. .............................. 180/53.4; 180/53.61
[58] Field of Search ............. 180/53.4, 53.6, 53.61; 74/13-15

[56] References Cited

U.S. PATENT DOCUMENTS

| | | | |
|---|---|---|---|
| 1,347,961 | 7/1920 | Moore | 74/14 |
| 2,574,177 | 11/1951 | Godet | 74/14 X |
| 2,712,109 | 6/1955 | Graziose | . |
| 2,749,747 | 6/1956 | Cline | 74/14 X |
| 3,148,549 | 9/1964 | Mohamed | 74/14 X |
| 3,859,589 | 1/1975 | Rush | 180/53.61 X |
| 3,861,204 | 1/1975 | Fillingim | 74/14 X |
| 4,128,800 | 12/1978 | Scott et al. | 74/13 X |
| 4,274,010 | 6/1981 | Lawson-Tancred | 60/398 |
| 4,280,061 | 7/1981 | Lawson-Tancred | 60/398 |

FOREIGN PATENT DOCUMENTS

| | | |
|---|---|---|
| 0246595 | 5/1987 | European Pat. Off. . |
| 2735350 | 3/1987 | Fed. Rep. of Germany . |
| 935151 | 6/1948 | France . |
| 2505270 | 11/1982 | France ............... 180/53.61 |
| 2112724 | 10/1982 | United Kingdom . |

*Primary Examiner*—Edward K. Look
*Assistant Examiner*—Hoang Nguyen
*Attorney, Agent, or Firm*—Klauber & Jackson

[57] ABSTRACT

There is disclosed a roller drive unit formed of one or more drive rollers, and which receives input power from any suitable engine powered wheeled vehicle which is available, the driving wheel(s) of the vehicle engaging the drive rollers so as to provide input power. The drive unit includes a hydraulic pump arranged to obtain input power from the drive rollers, and which operates a hydraulic motor under the control of a flow regulator so as to generate output power available from the motor at a substantially constant speed. The roller drive unit therefore is particularly suitable for providing emergency power for operating an electrical generator, and which can obtain its power input from any suitable available vehicle. The roller drive unit will therefore be particularly suitable for use as an emergency or standby drive system for operating electrical generators, and especially in remote locations where mains or other electrical power is not available.

12 Claims, 8 Drawing Sheets

ROLLER DRIVE UNIT

This invention relates to a roller drive unit which is capable of providing regulated output power to suit a load demand up to a pre-determined maximum.

The invention has been developed primarily, though not exclusively, in connection with a roller drive unit which can provide output power at a regulated speed suitable for driving a generator at a constant speed, even although a source of input power to the drive unit may be supplying power at a fluctuating speed, and also with a fluctuating power output. However, it should be understood that the roller drive unit according to the invention is not limited in its use for driving electrical generators, and other devices can derive input power from the drive unit.

A roller drive unit according to the invention will be particularly suitable for use in providing an emergency or stand-by drive system for operating electrical generators, or may be used to operate a mobile electric generator in remote locations where mains or other electrical power is not available.

In large hospital complexes in the developed world, it is usual to have permanent drive/generator sets available for stand-by operation in the event of a failure of the normal mains supply to the complex, so that lighting and hospital equipment can remain in operation. These stand-by units are known as "generating sets" and include diesel engines or gas turbine drive units coupled-up with an alternator and operating at a regulated speed to provide synchronous operation of the alternator. Evidently, these permanent installations represent a substantial and largely unutilised capital cost, as they are only very occasionally put into service. However, for large hospital complexes, this is regarded as an acceptable cost in the overall cost of installing and running the complex.

In the case of smaller hospitals, the costs of a permanent stand-by system of this nature become unacceptable, and especially for hospitals in third world countries.

Also, in another area of electrical power supply altogether, namely the supply of electrical power by mobile units where mains electricity is not available, it is usual for a generating set to be arranged on a trailer, and to incorporate its own engine, which operates independently of the engine of the towing vehicle. Here again, there is an under-utilised capital cost involved in connection with the independently operating engine.

There is therefore a clear need for a new design of drive unit which does not have its own engine to provide input power, and which is able to provide output power at a substantially constant speed suitable for driving a generator at synchronous speed, and yet which can derive its input power from any motor vehicle which happens to be available. Such a drive unit could be used as a stand-by unit permanently available at a small hospital complex, or may be transportable for use at locations where mains electricity is not available.

According to the invention there is provided a roller drive unit for providing regulated output power, in which the unit comprises:

an input drive roller assembly;

a guide path to the drive roller assembly for an engine-powered wheeled vehicle, the roller assembly being arranged relative to the guide path so as to be engageable drivingly by one or more driven wheels of the vehicle;

a hydraulic pump arranged to be driven by said roller assembly and to deliver a pressurised output to a load;

a reservoir communicating with the pump;

a flow regulator for controlling the pressurised output of the pump, the regulator being connectible to the load and to the reservoir and being arranged to allow a predetermined rate of flow to the load and to dump any excess via the reservoir.

Preferably, the load comprises a hydraulic motor which has a power output for delivering power at a substantially constant speed under the control of the flow regulator.

Thus, a roller drive unit according to the invention may be used as an emergency power stand-by unit, and any suitable available vehicle may be used to provide a source of input power to drive the input drive roller assembly, which provides output power at a regulated speed capable of meeting a load demand up to a predetermined maximum.

By making the drive unit of suitable size as to be readily portable, the unit may then be used to provide a regulated speed power output for use at locations where mains electricity is not available. The unit can then be readily transported e.g. on a trailer to a site, and then set-up ready for operation, and conveniently the towing vehicle may be backed-on to the unit to provide power input to the unit.

To facilitate movement of the vehicle onto (and off) the unit, it is preferred that the guidepath includes a ramp which raises the vehicle (as it moves along the ramp), prior to the driving wheels being lowered into driving engagement with the input drive roller assembly.

A roller drive unit according to the invention is particularly suitable for providing emergency electrical power by providing constant speed drive to an AC (or DC) generator. By virtue of the fact that the drive unit does not have its own engine, its cost may be lower than conventional generating sets, and its weight and size may also be reduced, thereby making it easier to transport and to install. As indicated above, any suitable vehicle available may be used to provide input power to the roller drive assembly of the unit, and provided the vehicle engine speed and power output is maintained, (by appropriate setting of the throttle and appropriate gear selection), at a level equal to or greater than that required by the load demand, satisfactory constant speed output power can be delivered, with any surplus flow rate of hydraulic fluid being dumped automatically to the reservoir by the flow regulating valve.

The input roller drive assembly will be designed to be capable of picking-up input drive from one or more driving wheels of a vehicle, and may comprise a single roller extending continuously throughout the width of any anticipated vehicle which may be used to drive the unit. Alternatively, a pair of separate and longitudinally spaced rollers may be provided, each being arranged to be driven by a wheel or wheels at one end of the driven wheel axle. Preferably, the rollers are coupled together for joint rotation, so as to compensate for any differences which might take place in the degree of adhesion between any driving wheel and the corresponding roller.

Conveniently, a pair of ramps may be provided, to guide the movement of the wheels of the vehicle to or from the input roller drive assembly, to facilitate easy access to the unit.

To facilitate the vehicle driving onto and driving-off the unit, before and after use, it is preferred that some form of lock be provided to lock the input roller drive assembly, whereby the driving wheels of the vehicle can gain traction in order to move on and off the unit. The lock may comprise a simple type of mechanical lock, or a hydraulic type of lock may be provided in the form of a shut-off valve on the output side of the hydraulic pump. The provision of a hydraulic shut-off valve on the output side of the pump will create a "dead head" which locks the hydraulic pump, which will thereby lock the input roller drive assembly coupled therewith.

For safety purposes, there will usually be provided a pressure relief valve in the hydraulic circuit, and the hydraulic shut-off valve, (to provide the hydraulic lock), will then be located upstream of the pressure relief valve.

To enable a driving vehicle, either front wheel drive or rear wheel drive, to be advanced to the unit from either direction, it is preferred that change-over valving be provided to enable the hydraulic pump to be used, for either direction of rotation of the input roller assembly.

Embodiments of roller drive unit according to the invention will now be described in detail, by way of example only with reference to the accompanying drawings in which.

Referring not to the drawings, there will be described in detail embodiments of a roller drive unit according to the invention which are intended to provide output power at a regulated speed to suit a predetermined load demand. A typical load which may be powered by the drive unit would be an AC or DC electrical generator, in which it is essential, for satisfactory generation of electrical power, that a substantially constant speed input drive is provided to the generator.

As will become evident form the subsequent detailed description of the preferred embodiments, a roller drive unit according to the invention has the following components:

an input drive roller assembly formed of one or more rollers;

a guide path to the drive roller assembly for an engine-powered wheeled vehicle, the roller assembly being arranged relative to the guide path so as to be engageable drivingly by one or more driven wheels of the vehicle;

a hydraulic pump arranged to be driven by the roller assembly and to deliver a pressurised output;

a reservoir communicating with the pump;

a load in the form of a hydraulic motor arranged to be driven by the hydraulic pump;

a flow regulator for controlling the pressurised output of the pump, the regulator being connected to the hydraulic motor and to the reservoir and being arranged to allow a predetermined rate of flow to the motor and to dump any excess via the reservoir; and a power output on the motor for delivering output power at a substantially constant speed under the control of the flow regulator.

Figure 1:
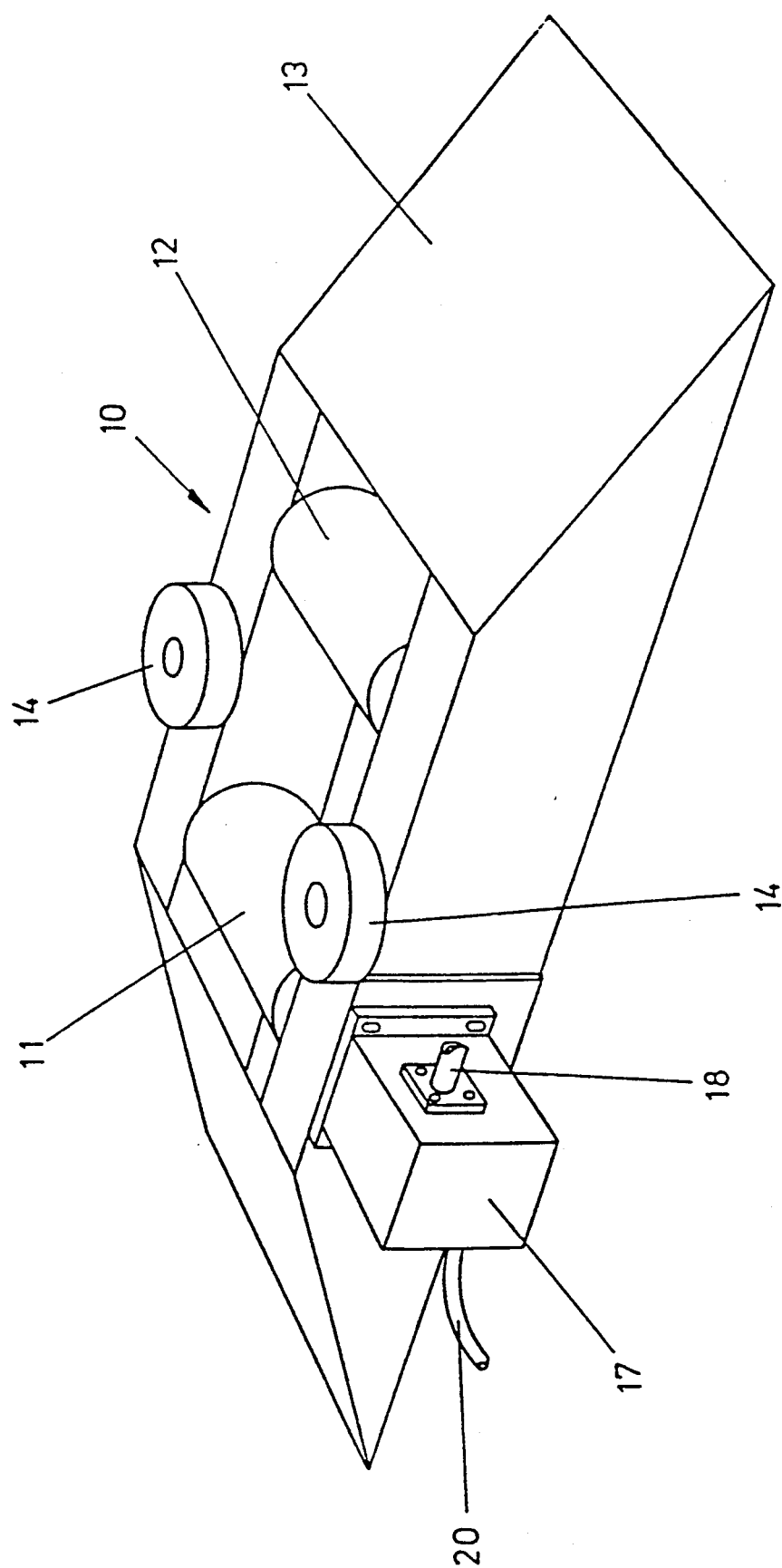
FIG. 1 is a schematic and perspective view of a first embodiment of roller drive unit according to the invention.

Referring not to FIG. 1 of the drawings, a roller drive unit according to the invention is designated generally by reference 10, and comprises a pair of laterally spaced rollers 11 and 12, and a ramp 13 leading to the drive roller assembly formed by rollers 11 and 12. The rollers 11 and 12 are laterally spaced so as to allow a driven wheel to be accommodated therebetween, and in the illustrating arrangement the roller 12 is an idle roller, whereas roller 11 is a drive roller for transmitting output drive by the unit. The rollers 11 and 12 may be directly coupled together eg by gears, to assist each other so as to increase traction area to the driving wheel(s).

The drive roller 11 is provided with an external gripping surface, by any suitable means, such as spraying with suitable material, and guide rollers 14 are provided, spaced longitudinally apart from each other with respect to the wheel axis, in order to centralise the driving wheel accommodated between the rollers 11 and 12.

Although not shown, a mechanical or hydraulic locking system may be provided, whereby the drive roller 11, and/or idle roller 12, can be locked against rotation, during driving-on and driving-off of the ancillary vehicle used to drive the unit.

Figure 1A:
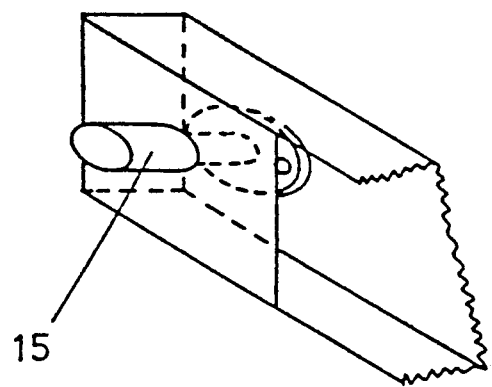
FIG. 1a is a detailed view of part of the drive unit shown in FIG. 1.

FIG. 1 shows a drive unit for engaging one wheel, or a pair of wheels on the end of a driving axle, and a further and similar drive unit may be provided for engaging the driving wheel(s) at the other end of the wheel axle. The power output from the input drive assembly is shown in the detailed view of FIG. 1a, which comprises a shaft end 15 which may be splined or plain, depending upon the type of drive coupling which is required.

Figure 2:
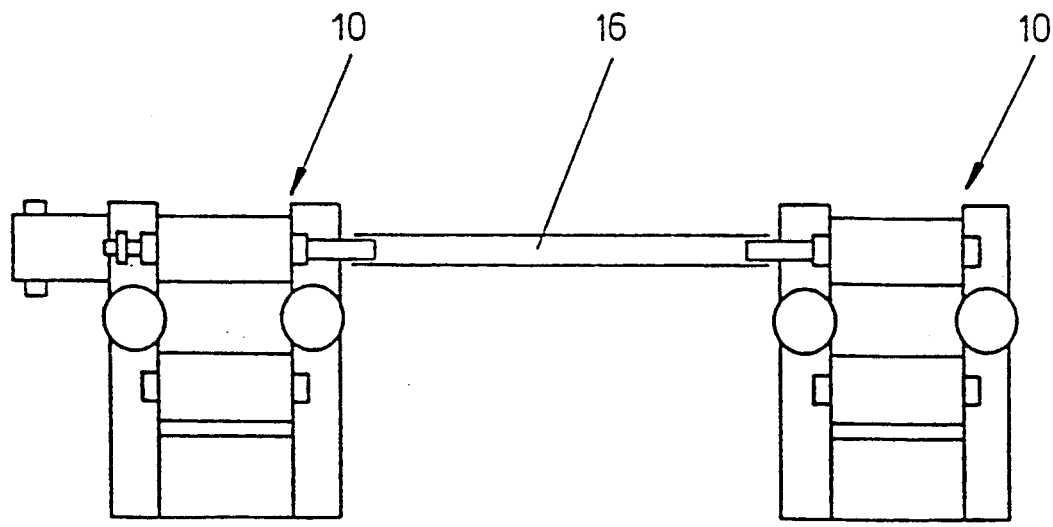
FIG. 2 is a schematic plan view of a further embodiment of drive unit according to the invention.

FIG. 2 shows schematically in plan view a generally similar arrangement of drive units to that shown in FIG. 1, but in which a telescopic power take-off shaft 16 extends between the two drive units 10 and thereby couples the units together for joint rotation, whereby the two units can compensate automatically for any differences in adhesion between the driving wheels and the respective rollers.

A hydraulic pump 17 is provided which is driven continuously by the drive unit, and receives an input supply of hydraulic fluid along input line 18 (see FIG. 1) from a hydraulic reservoir or oil tank 19, and delivers a pressurised output along output line 20.

Figure 3:
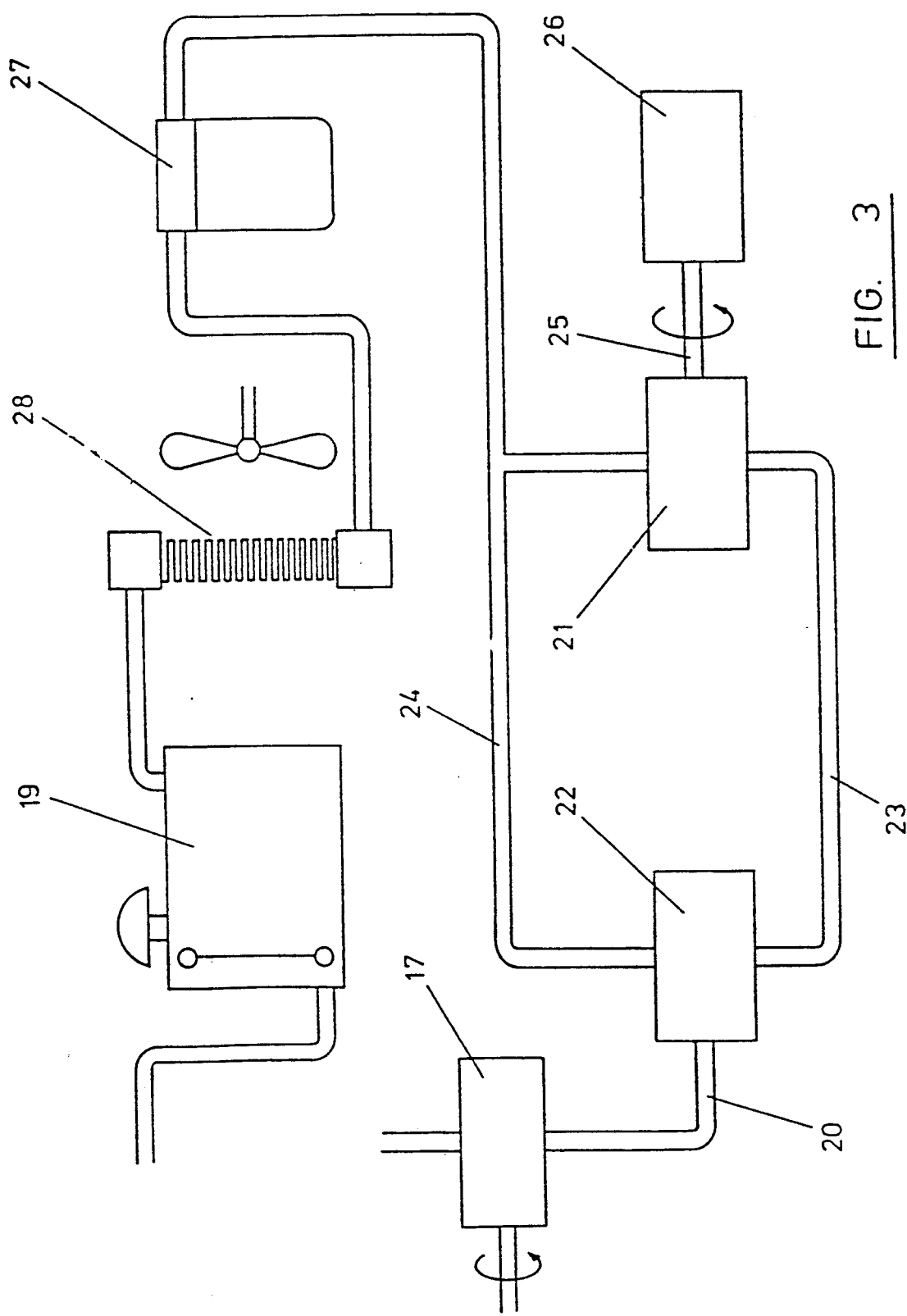
FIG. 3 is a schematic illustration of the hydraulic circuit employed with a roller drive unit according to the invention.

A hydraulic motor 21 (see FIG. 3) is arranged to be driven by the hydraulic pump 17, but the pressurised output along output line 20 is first conveyed to a flow regulator 22 which is connected by a supply line 23 to the hydraulic motor 21, and to the reservoir 19 via a dumping line 24. The flow regulator 22 controls the flow rate of fluid supplied to the motor 21 to a predetermined rate, and automatically dumps any excess to the reservoir 19 via the dumping line 24. A power output 25 on the motor delivers output power at a substantially constant speed, under the control provided by the flow regulator 22, and as shown in FIG. 3 this output is coupled with a load 26 which requires a constant speed of input power. The load 26 may comprise an alternator which is intended to operate at synchronous speed, or may comprise a DC electrical generator. However, the load 26 may comprise many other types of power consumer, such as an air compressor, or a portable rotary tool.

As shown in FIG. 3, the dumping line 24 may return the excess fluid (beyond that required to operate the hydraulic motor 21 at the required speed) to the reservoir 19 after passage via a filter 27, a fan assisted cooler 28 and then to the reservoir 19.

Figure 4:
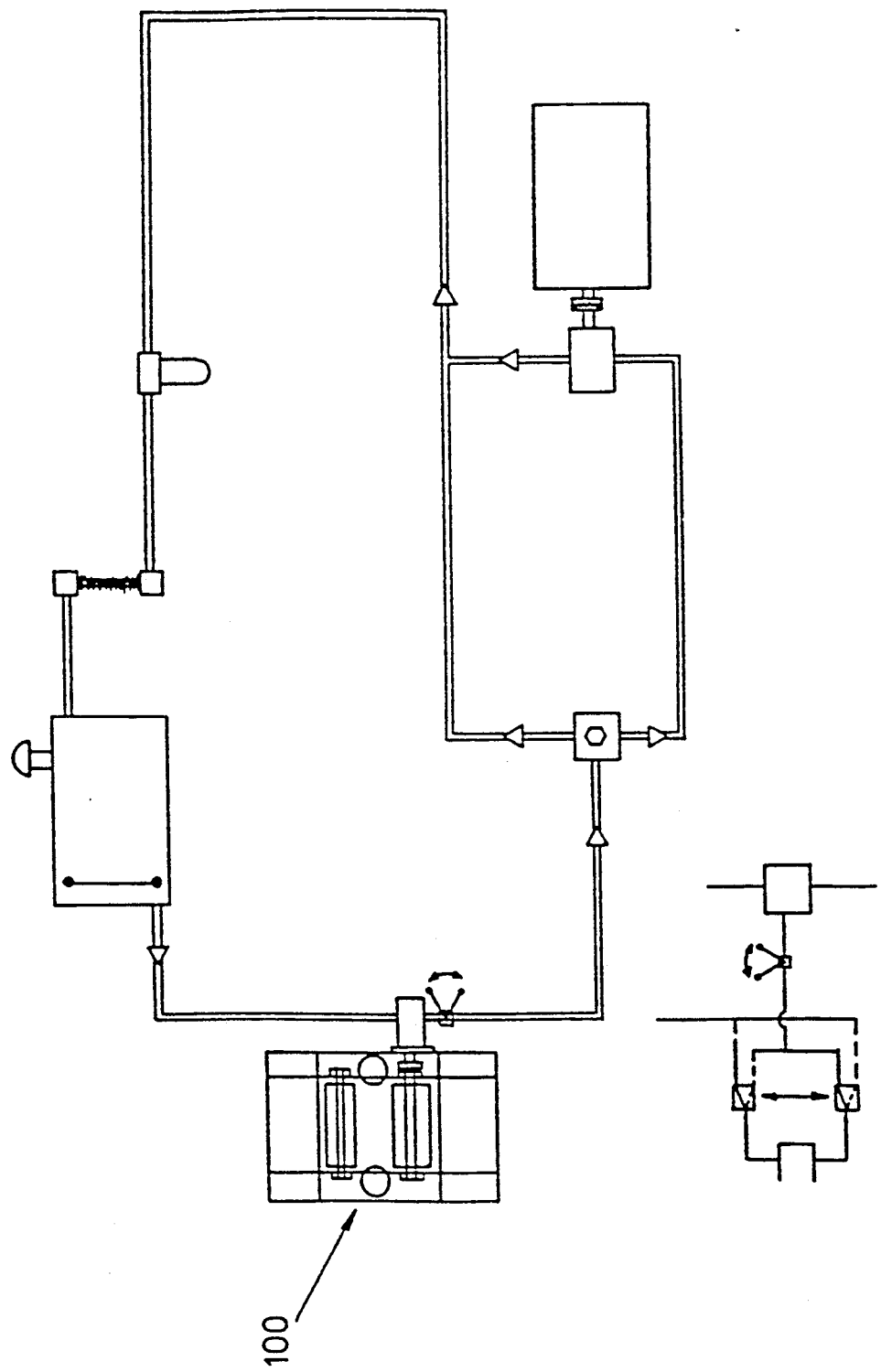
FIG. 4 is a hydraulic circuit diagram of the operating components linked with the output from the drive unit.

One example of a vehicle which may be used to operate the drive unit comprises a mobile dental clinic, which is driving a roller drive unit which will power an electrical generator permanently mounted in the towing vehicle, to generate electrical power for operating, for example, an x-ray unit. FIG. 4 shows a schematic layout of the various elements employed during operation of a roller drive unit according to the invention.

Therefore, as will be evident from the above description of preferred embodiments of the invention, there is provided a roller drive unit which may form part of a complete power system for generating electrical power, if connected to a suitably equipped generator, or alternator. The voltage and frequency tolerances will be within accepted limits, from no-load to full-load, single and three phase, AC and DC, 50 to 60 Hz, or high frequency, or welding generators.

The system may also be used to provide compressed air, if connected to a suitably equipped air compressor.

The drive unit may also be used to power a wide range of hand held tools, such as chainsaws, grinders, drills, road breaking jack hammers, descaling and chipping hammers, all of which tools are currently available.

In a simplified version of the drive unit, it may be arranged to provide rotary mechanical power for equipment using flexible drives, such as vibrating pokers, grinders and pumps.

The drive unit may also be used to re-activate broken down equipment which has hydraulic rams, or to power hydraulic cutting and rescue equipment.

The drive unit will also be able to operate in almost any climatic condition, and can be configured to different arrangements, as follows:

1. It can be assembled as a complete unit, suitable for permanent fixed locations;
2. The drive part may comprise one unit, the accessories another unit, and the driving unit another assembly.
3. Each assembly can be separate from each other assembly, being located some distance apart, thereby aiding in installation of different assemblies in suitable locations. For example, a driven generator could be arranged in a switchboard room with the accessories in a separate "dirty room", and the driving unit outside, to be powered by any convenient vehicle available.
4. The driving unit can be lifted and carried by one or two men, depending upon size.

The power source used to power the driving unit may be virtually any ordinary engine-powered wheeled vehicle, such as a car, van, land rover or small truck.

The vehicle is driven onto the driving unit (2 driving units ill be needed for high powers, or vehicles having a limited slip differential), and the 2 units connected together by an inexpensive power take-off shaft.

The vehicle is set to run at a specified speed, say 10 miles per hour, in as high a gear as will give the necessary power. A simple telescopic rod with clamps at each end may be fastened to the accelerator pedal, and the seat frame will hold the speed approximately correctly. The driving wheels drive the input roller assembly, and the hydraulic pump is operated and draws oil from the hydraulic reservoir. The oil is pumped to the flow regulating valve, which spills-off any excess oil flow, over and above that flow rate which is pre-set for the equipment being powered. Any excess oil is returned to the oil tank via a cooler and filter. The correct oil flow for the speed required is delivered to the hydraulic motor on the driven part, thereby powering the generator, or other load demand.

As load on the generator or compressor increases by consumer demand, only the pressure in the system increases, causing more power to be drawn from the vehicle.

If the vehicle cannot provide the power required, and the engine begins to lose speed, so causing oil flow to drop, then a lower gear ratio should be selected, and engine speed increased to maintain the recommended vehicle running speed of say, 10 miles per hour indicated road speed, up to the design criteria of the vehicle and the drive unit.

The roller drive unit can be built-up from well tried and readily available components, and will be constructed sufficiently robustly according to the intended use. For market demand in which reliability is the supreme requirement, such as for military use, the drive unit will be built to a high specification, using quality components for long life, frequent use and regular mobility, to render the unit suitable for military, (or medical unit) use. For less demanding markets (such as for light duty "seasonal" use by caravanners, campers, explorers), the unit can be built of lightweight materials using alloy components, and a fibreglass tank etc. It can also be built to a budget level to suit various markets, by using pressed steel frames, cheap bearings and relatively unsophisticated alternators.

FIG. 4 is a hydraulic circuit diagram of the control of the delivery of hydraulic pressure fluid from a vehicle operated drive unit 100, with the hydraulic fluid being routed according to requirements, to operate various components.

Figure 5:
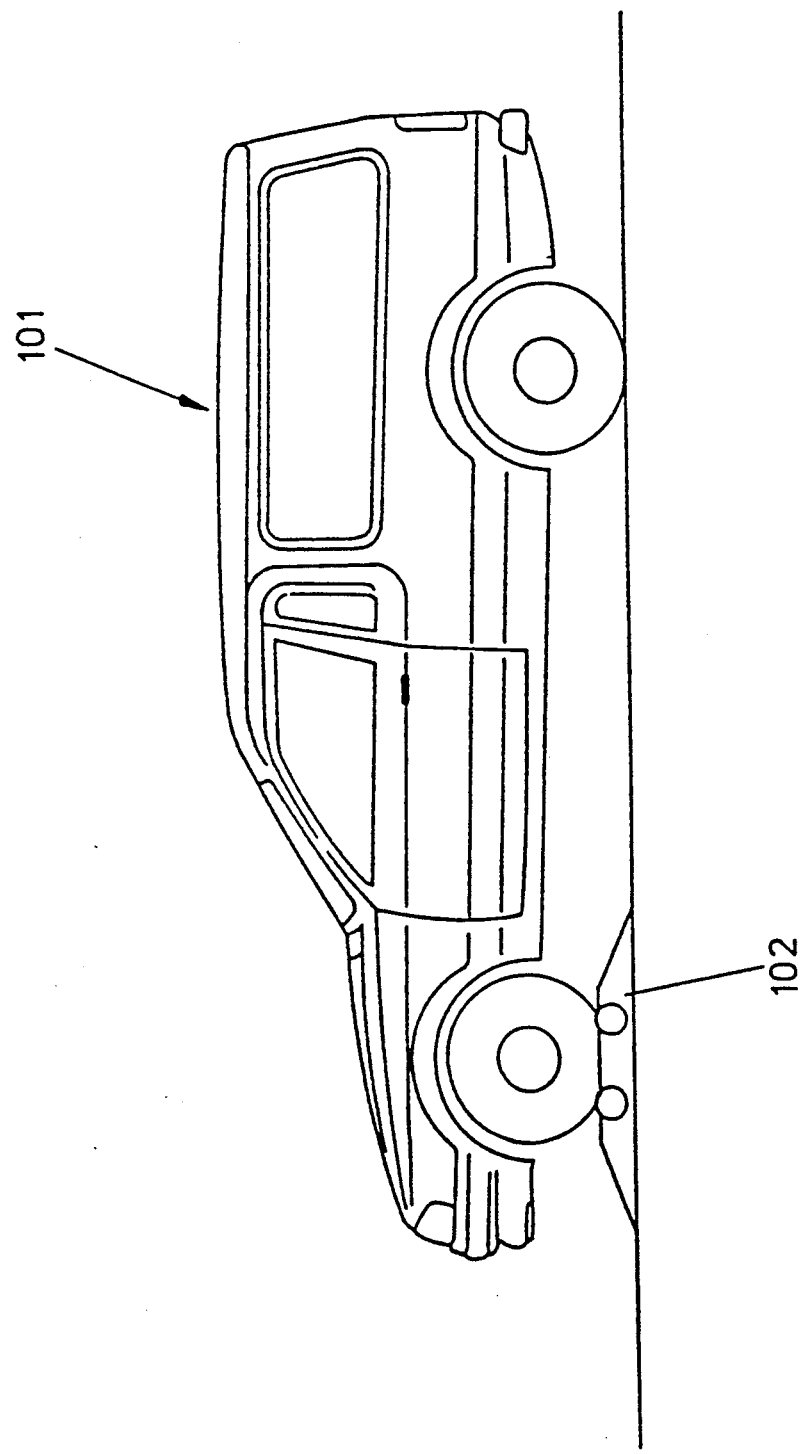
FIG. 5 is a side view illustrating the use of a front wheel drive vehicle to operate the drive unit.
Figure 6:
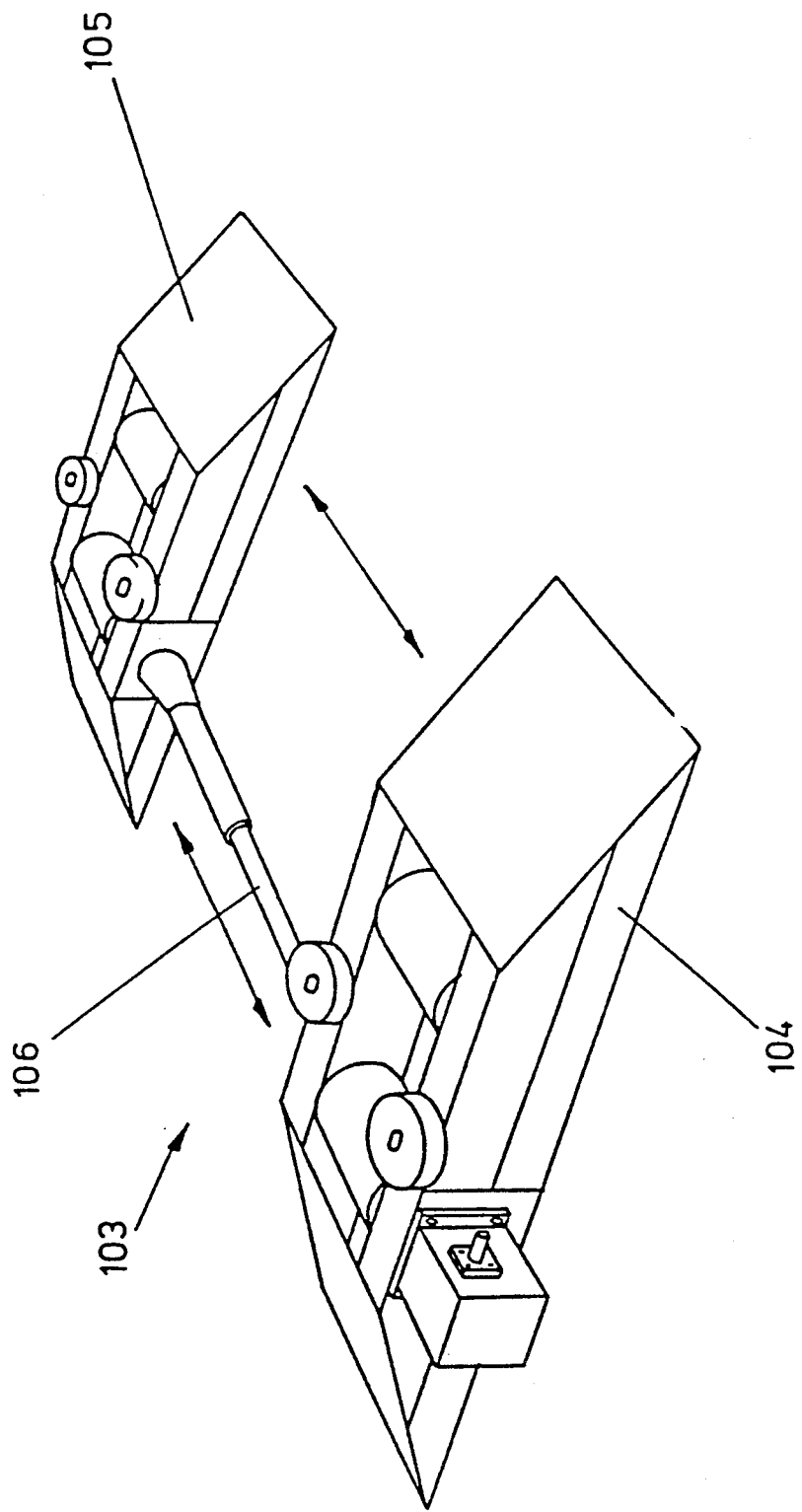
FIG. 6 is a perspective illustration of a modified embodiment of drive unit, having a pair of separate roller drives, each having its own ramp, and connected together by a drive shaft coupling which is longitudinally adjustable in order to vary the spacing apart of the drive units.

FIG. 5 shows the use of a front wheel drive vehicle 101 for operating a drive unit 102, and FIG. 6 shows a drive unit 103 which is composed of a pair of individual drive units 104 and 105, each having its own ramp, and coupled together by a telescopic drive shaft coupled 106 which can be longitudinally adjusted in order to vary the spacing apart of the drive unit 104 and 105 to suit the spacing apart of the drive wheels of a vehicle used to operate the drive unit.

Figure 7:
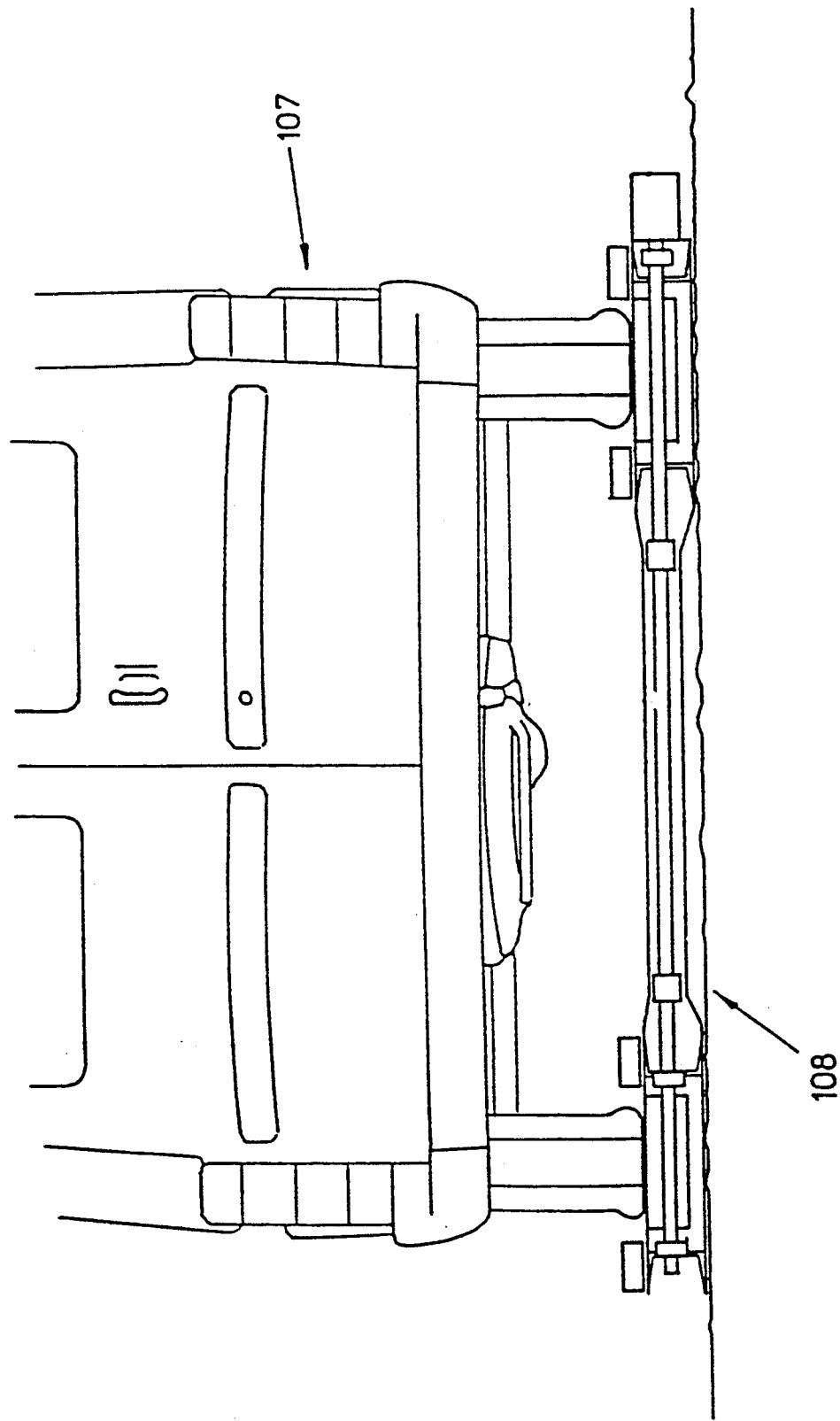
FIG. 7 is a rear view of a rear wheel drive vehicle being used to operate the drive unit; and, FIG. 8 is a diagrammatic illustration of a mode of use of the drive unit.
Figure 8:
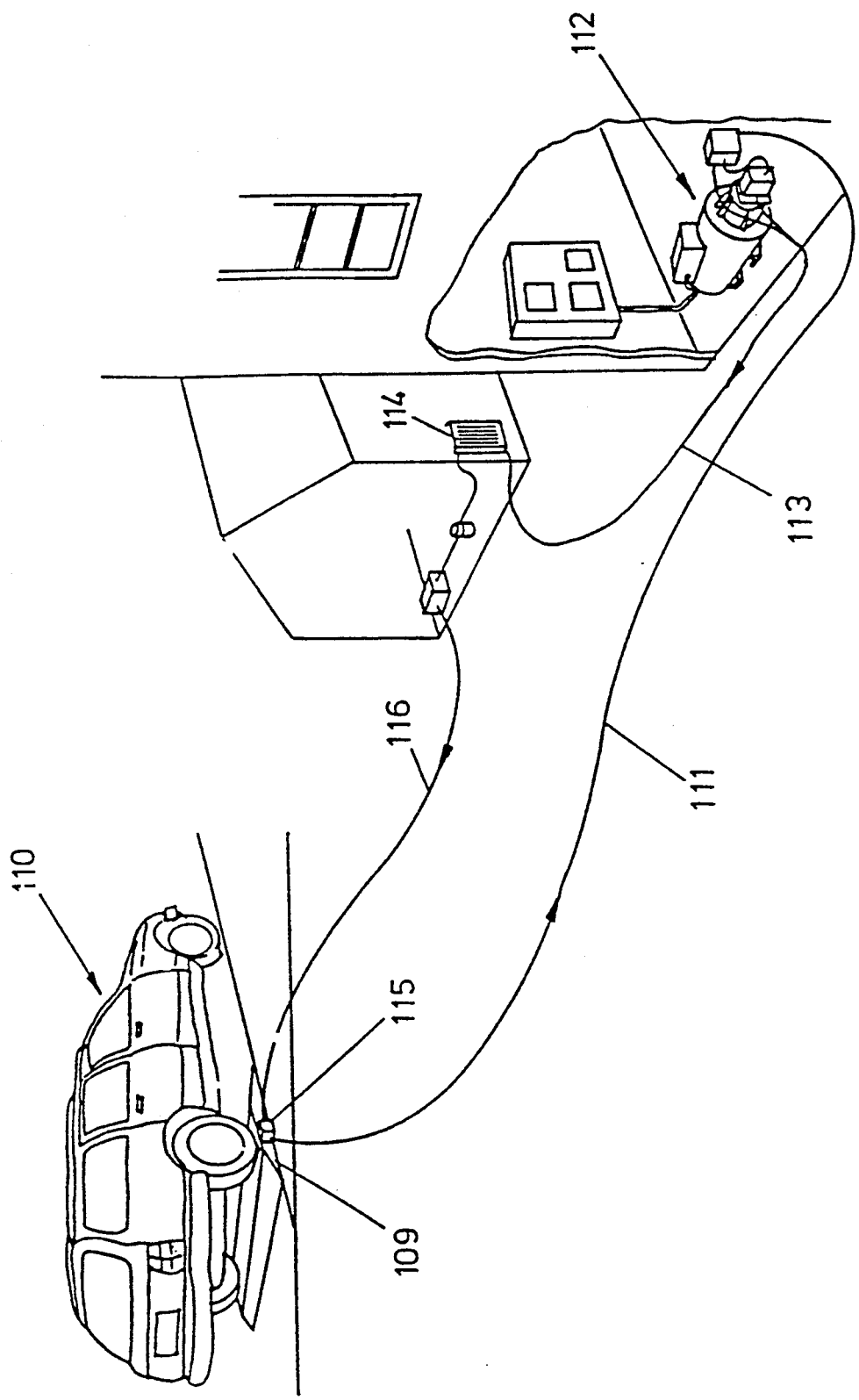

FIG. 7 illustrates the use of a rear wheel drive vehicle 107 to operate a drive unit 108, and FIG. 10 shows a schematic arrangement of drive unit 109 being driven by a vehicle 110 and providing a supply of controlled pressure fluid along supply line 111 to a generator unit 112, and which has a return line 113 leading to cooler unit 114 and then back to the hydraulic pump unit (not shown in detail) housed within housing 115 via further return line 116.

For safety purposes, it may be desirable to provide a mechanical device for preventing excessive application of input power or speed to the drive unit, and this may take a number of forms. In one example, a clutch device could be built-in to one of the drive rollers. Alternatively, a torque convertor may be coupled up with the mechanical output drive from the drive unit, and arranged so as to cavitate when driven in excess of a predetermined limit.

An alternative arrangement could be to provide a mechanical or hydraulic coupling which is arranged to slip continuously, when a predetermined input speed is reached, so as to limit the torque output obtainable from the drive unit, even when the vehicle operating the drive unit is driven faster than a predetermined speed necessary to operate the drive unit and components to be driven thereby.

Thus, in practice, the drive unit may include an overspeed device to discontinue the rotating power supply, by one means or another, to the hydraulic pump coupled to the drive roller. This overspeed device could operate when the driven speed of the roller exceeds the designed speed required to operate particular components, such as an electrical generator. Normally, the output of hydraulic fluid from the pump will increase approximately proportionally to the driven speed, and therfore the usual flow control valve, pressure relief valve, pipes, hoses and filters would ideally need to be sized to accept the "higher than necessary" drive flow. However, given that these larger components are more expensive and more bulky, to prevent the necessity to incorporate them, it is preferable for an arrangement to be provided which can cease the rotating power, or disconnect the drive to the hydraulic pump, if the driving roller should happen to be rotated substantially faster than the designed speed of the roller drive unit for operating particular components. The overspeed device may be one or more of a number of different types, to suit requirements.

A simple electrical centrifugal switch may be provided, arranged to come into operation upon overspeed conditions developing, by electrical connection into the ignition system of a petrol engine powered driving vehicle, thereby causing the ignition circuit to be broken and thereby stopping the engine. Alternatively, this could be used on diesel engined vehicles which are already provided with, or could be subsequently fitted with an electrically operated stop control.

As an alternative to the centrifugal switch, there could be provided electronic speed sensor monitoring of one of the rotating components, and which would operate in the same way as the centrifugal switch in the event of overspeed conditions developing.

A mechanical arrangement could be provided in the form of a clutch arranged to operate in the event of overspeed, thereby disconnecting the wheel drive roller from the hydraulic pump. This clutch could be operated in several ways:

(a) by centrifugal force, whereby a set of toggles could be attached to the roller and which are spring loaded to swing out over a pre-set speed, a claw being provided on the toggles to mechanically operate a clutch. The clutch could be of various different types, depending on suitability and availability;

(b) by hydraulic means, in which a flow sensing valve is incorporated in the output side of the driven hydraulic pump, so that when flow exceeds a pre-set rate, hydraulic fluid would operate a clutch to disconnect the roller from the pump;

(c) by the use of electrical control, as set out in (a) and (b) above, an electrical circuit could be switched so as to cause an electrically operated clutch to disconnect the drive between the roller and the pump.

The clutch could be additional to the coupling normally used to connect the roller to the hydraulic pump, or could replace that coupling. The overspeed device could be incorporated as a "bolt-on" attachment to the roller drive unit, of could be built into it, or incorporated within the roller itself.

With regard to the possible use of a torque convertor, or fluid coupling, to act as an overspeed responsive device, operating with a liquid or solid transmission medium, this also could be used to limit the driven speed of the hydraulic pump, provided that it is set up correctly to undergo controlled slippage under excess speed. Regardless of which overspeed device is incorporated in the roller drive unit, it will also be an added safety feature, as it will make it pointless for the operator to have the driving wheel(s) of the vehicle running faster than the design speed of the roller drive unit, as this will merely result in operation of the overspeed compensating device, and with no increase in output power being transmitted.

The overspeed device will also act as a safety feature, if the throttle setting device should fail, or if an incorrect gear is selected by the operator, resulting in too great a road speed design for the design characteristics of the unit being driven.

Furthermore, as the tractive resistance on the wheel driving the roller unit will be considerably reduced after the overspeed device has operated, the risk of the vehicle running-off the roller drive unit, due to the non-rotating wheel picking up traction through the differential of the vehicle, will be reduced.

The fitting of the overspeed device will also aid the operating economy of the equipment, as it will be pointless for the vehicle to run too fast, since no extra power will be transmitted through the roller drive unit.

It should be clear that, while the overspeed compensating device is a useful additional feature for the roller drive unit, it is not absolutely essential, and the roller drive unit will indeed operate quite satisfactorily without it. It is also not intended that the overspeed device should form part of the speed regulation system of the controlled output of the unit.

What is claimed:

1. A roller drive unit for providing regulated output power, in which the unit comprises:

an input drive roller assembly;

a guide path to the drive roller assembly for an engine-powered wheeled vehicle, the roller assembly being arranged relative to the guide path so as to be engageable drivingly by one or more driven wheels of the vehicle;

a hydraulic pump arranged to be driven by said roller assembly and to deliver a pressurised output fluid to a load;

a fluid reservoir communicating with the pump; and flow regulator means for controlling the pressurised output fluid of the pump to a predetermined flow rate by allowing only a predetermined rate of fluid flow to the load and by dumping any excess fluid to the reservoir, the regulator means being connected to the load and to the reservoir.

2. A roller drive unit according to claim 1, in which the load comprises a hydraulic motor having an output for delivering output power at a substantially constant speed under the control of the flow regulator means.

3. A roller device unit according to claim 2, in which the guide path includes a ramp for raising the vehicle as it moves along the ramp, prior to the driving wheels being lowered into driving engagement with the input drive roller assembly.

4. A roller drive unit according to claim 2 or 3, in which an electrical generator is arranged to be driven from the power output of the motor.

5. A roller drive unit according to claim 1, in which the input roller drive assembly comprises a single roller extending continuously throughout the width of any anticipated vehicle to be used to drive the unit.

6. A roller drive unit according to claim 1, in which the input roller drive assembly comprises a pair of separate and longitudinally spaced rollers, each being arranged to be driven by at least one wheel at one end of the driven wheel axle.

7. A roller drive unit according to claim 6, in which the rollers are coupled together for joint rotation.

8. A roller drive unit according to claim 1, in which a pair of ramps is provided to guide the movement of the wheels of the vehicles to or from the input roller drive assembly.

9. A roller drive unit according to claim 1, in which means is provided for locking the input roller drive assembly, in the form of one of a mechanical and hydraulic type of lock.

10. A roller drive unit according to claim 9, in which a hydraulic lock is provided in the hydraulic circuit and is arranged upstream of a pressure release valve.

11. A roller drive unit according to claim 1, including change-over valving operable to enable the hydraulic pump to be driven, for either direction of the rotation of the input roller assembly.

12. A roller drive unit according to claim 1, including an overspeed compensating means for limiting the power output from the input roller drive assembly.

* * * * *